UNITED STATES PATENT OFFICE.

CHARLES B. HEADLY, OF PHILADELPHIA, PENNSYLVANIA.

FRAME FOR EYEGLASSES AND SPECTACLES.

SPECIFICATION forming part of Letters Patent No. 318,733, dated May 26, 1885.

Application filed May 5, 1884. (No specimens.)

*To all whom it may concern:*

Be it known that I, CHARLES B. HEADLY, of the city and county of Philadelphia, and State of Pennsylvania, have invented a new and useful Improvement in Frames for Eyeglasses and Spectacles, of which the following is a specification.

The object of my invention is to produce a spectacle or eyeglass frame which in appearance and in certain physical characteristics is similar to a frame formed of gold of fourteen carats fineness.

My invention consists in an eyeglass or spectacle frame formed of copper and tin alloyed together in the proportion of one hundred parts of copper and twelve parts of tin, said alloy being made by melting said metals together or by melting them separately and then mixing them, and finally casting the alloy in any desired shape, the manipulation or working of this alloy for the production of said frame being the same as that of other metals for a like purpose.

I have discovered that an alloy composed, as above mentioned, of substantially one hundred parts of copper and twelve parts of tin possesses not only the color of gold of fourteen carats fineness, but also about the same degree of elasticity, as well as in a great degree the non-oxidizing or non-tarnishing characteristic of the same, and that eyeglass or spectacle frames manufactured therefrom possess to a large extent all the advantages incident to the use of fourteen-carat gold in the manufacture of said articles.

I am aware that alloys of copper and tin in various proportions have heretofore been made and used in the arts for sundry purposes; but I am not aware that an alloy of substantially the composition above set forth has heretofore been known to possess the characteristics above enumerated, or to be fit for, or to have been applied to, the manufacture of eyeglass and spectacle frames.

Having thus described my invention, I claim—

As a new article of manufacture, a frame for an eyeglass or spectacle formed of copper and tin alloyed in the proportions substantially as specified.

In testimony whereof I have hereunto signed my name this 2d day of May, A. D. 1884.

CHARLES B. HEADLY.

In presence of—
 W. C. STRAWBRIDGE,
 J. BONSALL TAYLOR.